United States Patent [19]
Yates, IV et al.

[11] Patent Number: 5,548,306
[45] Date of Patent: Aug. 20, 1996

[54] VISIBLE AND TOUCHABLE TOUCH SCREEN SHIELD

[75] Inventors: Joseph W. Yates, IV, Duluth; Donald L. Forsythe, Dacula, both of Ga.

[73] Assignee: AT&T Global Information Solutions Company, Dayton, Ohio

[21] Appl. No.: 234,807

[22] Filed: Apr. 28, 1994

[51] Int. Cl.⁶ .............................. G09G 1/00; G09G 3/00
[52] U.S. Cl. ................................................. 345/174
[58] Field of Search ................................. 345/173, 174; 361/212, 220; 348/820; 178/18, 19, 20

[56] References Cited

U.S. PATENT DOCUMENTS

| | | | |
|---|---|---|---|
| 3,974,332 | 8/1976 | Abe et al. | 178/18 |
| 4,071,691 | 1/1978 | Pepper, Jr. . | |
| 4,129,747 | 12/1978 | Pepper, Jr. . | |
| 4,198,539 | 4/1980 | Pepper, Jr. . | |
| 4,293,734 | 10/1981 | Pepper, Jr. . | |
| 4,371,746 | 2/1983 | Pepper, Jr. . | |
| 4,497,977 | 2/1985 | Saito et al. | 178/19 |
| 4,636,582 | 1/1987 | Moriwaki et al. . | |
| 4,672,153 | 6/1987 | Kikuchi . | |
| 4,853,497 | 8/1989 | Landmeier . | |
| 4,853,790 | 8/1989 | Dickie . | |
| 5,130,500 | 7/1992 | Murakami et al. . | |
| 5,210,542 | 5/1993 | Pett et al. . | |
| 5,274,198 | 12/1993 | Landmeier . | |
| 5,381,160 | 1/1995 | Landmeier | 345/174 |
| 5,450,277 | 9/1995 | Wescott et al. | 361/220 |
| 5,457,289 | 10/1995 | Huang et al. | 345/174 |

*Primary Examiner*—Jeffery Brier
*Attorney, Agent, or Firm*—Albert L. Sessler, Jr.

[57] ABSTRACT

A shield for shielding a capacitive touch screen from external noise arising from stray capacitance is located between the exterior housing of a touch screen device and the touch screen itself. The shield comprises a thin piece of conductive material such as aluminum foil laminated between two layers of insulating material such as a polycarbonite and is secured to the upper surface of the touch screen, as by an adhesive. The shield has a central opening which is smaller than an opening in the housing of the touch screen device that is provided to enable the touch screen to be contacted for entry of data, and to enable a user to view a display that is located beneath the touch screen, which is transparent. Portions of the shield are thus visible, and the central opening of the shield thus defines the portion of the display which can be viewed. Different sizes of displays can therefore be used in the touch screen device by using shields with different sizes of central openings, without the need for redesigning the exterior housing of the touch screen device.

18 Claims, 4 Drawing Sheets

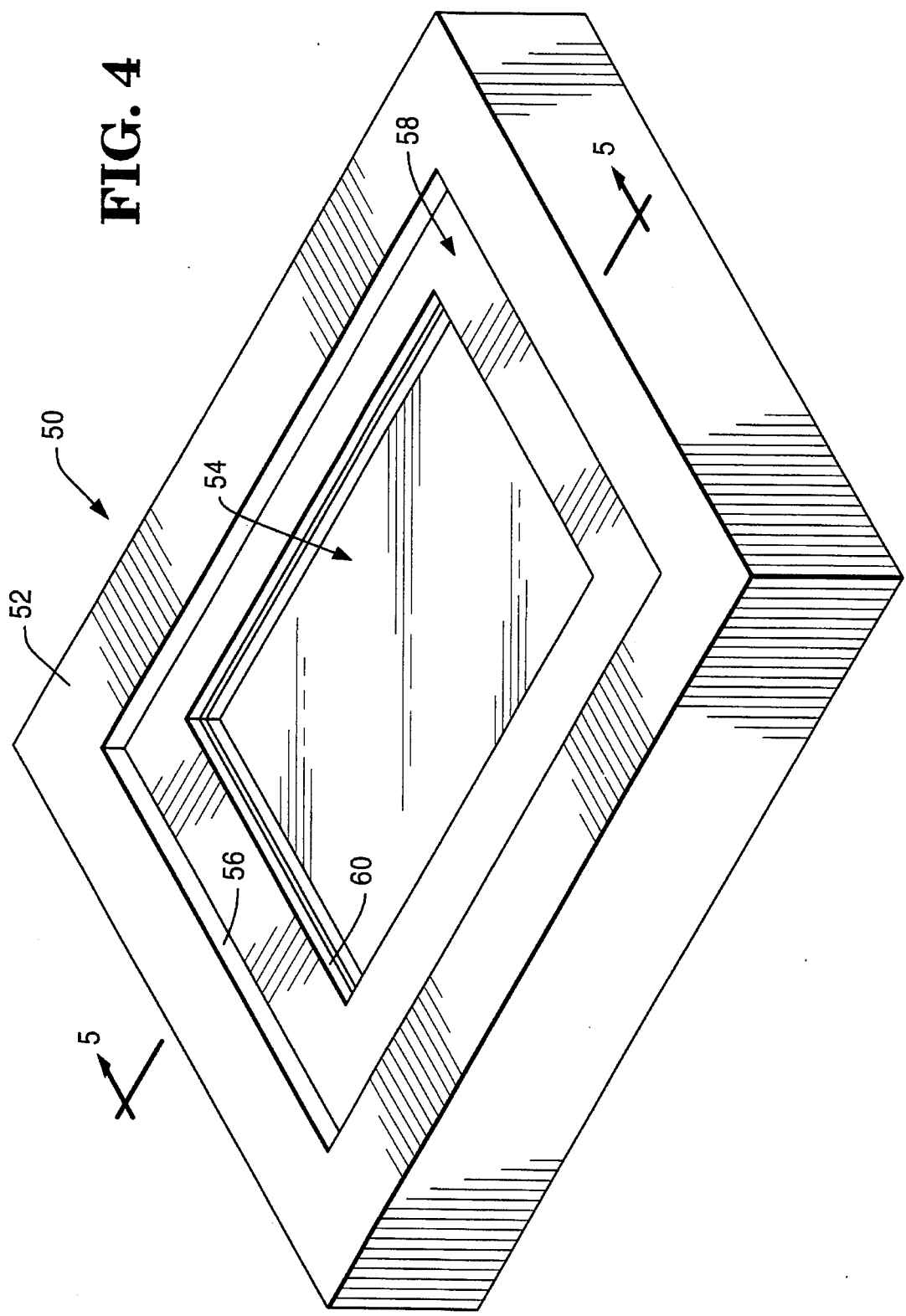

VISIBLE AND TOUCHABLE TOUCH SCREEN SHIELD

BACKGROUND OF THE INVENTION

The present invention relates to a touch screen device and more particularly to a shield used in the touch screen device to shield the touch screen from external noise due to stray capacitance.

Capacitive touch screens have become one of the major touch screen technologies in marketplaces such as the hospitality and quick-service point of sale marketplaces, mainly due to their extremely high durability and their resistance to interference from foreign objects on the screen, such as dirt and grease.

Capacitive touch screens calculate touch points by measuring the amount of current that the body of a user of the screen draws from the screen. This current drain is caused by capacitive coupling of the user's finger (and body) from a conductive film layered on the glass of the screen. A capacitor is defined as being two conductive surfaces separated by a thin insulating surface. In the case of a capacitive touch screen, as shown in FIG. 1, the two conductive surfaces are the user's finger 10 and a conductive coating 12 on the glass 14 of the touch screen. The insulating substance is a thin protective covering 16 layered on top of the conductive coating 12. This combination forms a capacitor, represented symbolically in FIG. 1 by the capacitor 18.

The touch point is calculated by measuring the current drain at the four corners of the touch screen. The closer a user's touch is to a corner, the more current drain will be measured from that corner. A microprocessor circuit compares the current drain from the four corners and calculates an X, Y coordinate for the touch point.

It is the fact that the hand does not actually touch the conductive coating that makes capacitive touch screens so durable, for reasons which include the following. The insulating coating can be made very strong so that it protects the conductive coating from scratching and wearing over time. Any foreign objects on the insulating coating (dirt, grease, etc.) will not degrade the performance of the touch screen. The touch screen assembly has no moving parts; therefore it can be sealed to the bezel of the touch screen device to prevent leakage of liquids into the device.

Unfortunately, it is also the fact that the hand does not touch the conductive coating of the touch screen that makes capacitive touch screens susceptible to interference. For example, as shown in FIG. 2, a left hand 20 of a user placed on the bezel 22 of a touch screen device 24 will induce enough stray capacitance to cause error, as shown by point 26, in the X, Y coordinates which are calculated by the system to represent a point 28 touched on the touch screen 30 by a finger 32 of the right hand 34 of the user.

The reason that the touch screen 30 so easily picks up the capacitance (C') of the hand 20 is that the active area of the touch screen 30 is only approximately 75% of the entire area of the glass. The 25% unused area of glass (hidden from view under the bezel 22) is required to distribute charge evenly throughout the conductive coating. Although this portion of+the touch screen is unused, it is still sensitive to capacitance. Therefore it easily picks up the large capacitance of the hand 20 since only the thin bezel 22 separates the hand 20 from the glass of the touch screen 30.

Current methods to shield this sensitive unused portion of the touch screen 30 from stray capacitance induced by the hand 20 of a user of the touch screen device 24, which includes the touch screen 30 and an associated display 34, include covering the unused portion of the screen with a piece of conductive tape 33 beneath the bezel 22, as shown in FIG. 3. The touch screen 30 typically comprises a glass base 36 having a conductive coating 38 and an insulating coating 40 disposed thereover. The conductive tape 33 typically comprises a plastic tape base 42 with a silk-screened conductive pattern 44 on its surface. The tape 33 is driven with the same signal that is used to drive the four corners of the touch screen glass. Although the conductive tape certainly is an improvement over the unshielded glass, and insulates the touch screen from a large portion of any outside interference, it still allows some stray capacitance to get through. Two other drawbacks of the tape shield method are that it is visually unattractive, and that it must be electrically isolated from grounding sources since it carries a signal.

One effective type of shield which may be employed to shield a touch screen is the subject of U.S. patent application Ser. No. 08/234,881, filed Apr. 28, 1994, Docket No. 5948, assigned to the assignee of the present application, and incorporated herein by reference. This shield comprises two interconnected rectangular metal elements which are disposed on either side of the touch screen. However it would be desirable to provide a shield which is even less expensive than such a shield, and which can be assembled to the touch screen in a very simple manner.

SUMMARY OF THE INVENTION

The present invention provides a touch screen shield that shields the touch screen from external noise due to stray capacitance. This shield is insulated from grounding sources and provides a "matte" which allows multiple sizes of displays to be used with the same touch screen sensor.

It is accordingly an object of the present invention to provide a novel and effective shielded capacitive touch screen device.

Another object is to provide a capacitive touch screen shield which is visually attractive.

Another object is to provide a capacitive touch screen shield which is insulated from grounding sources, thereby allowing the shield to be touched by the user.

Another object is to provide a touch screen shield which provides a "matte" which allows multiple sizes of displays to be used with the same touch screen sensor.

Additional benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

FIG. 4 is a perspective view of a touch screen device.

DETAILED DESCRIPTION

Figure 1:
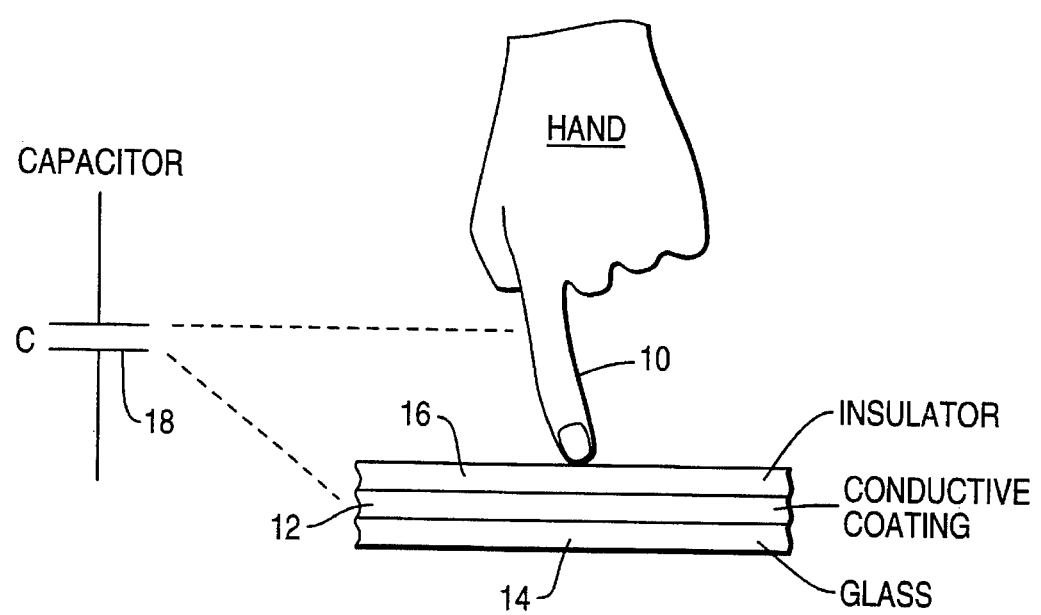
FIG. 1 is a diagrammatic view illustrating the operation of a capacitive touch screen.
Figure 2:
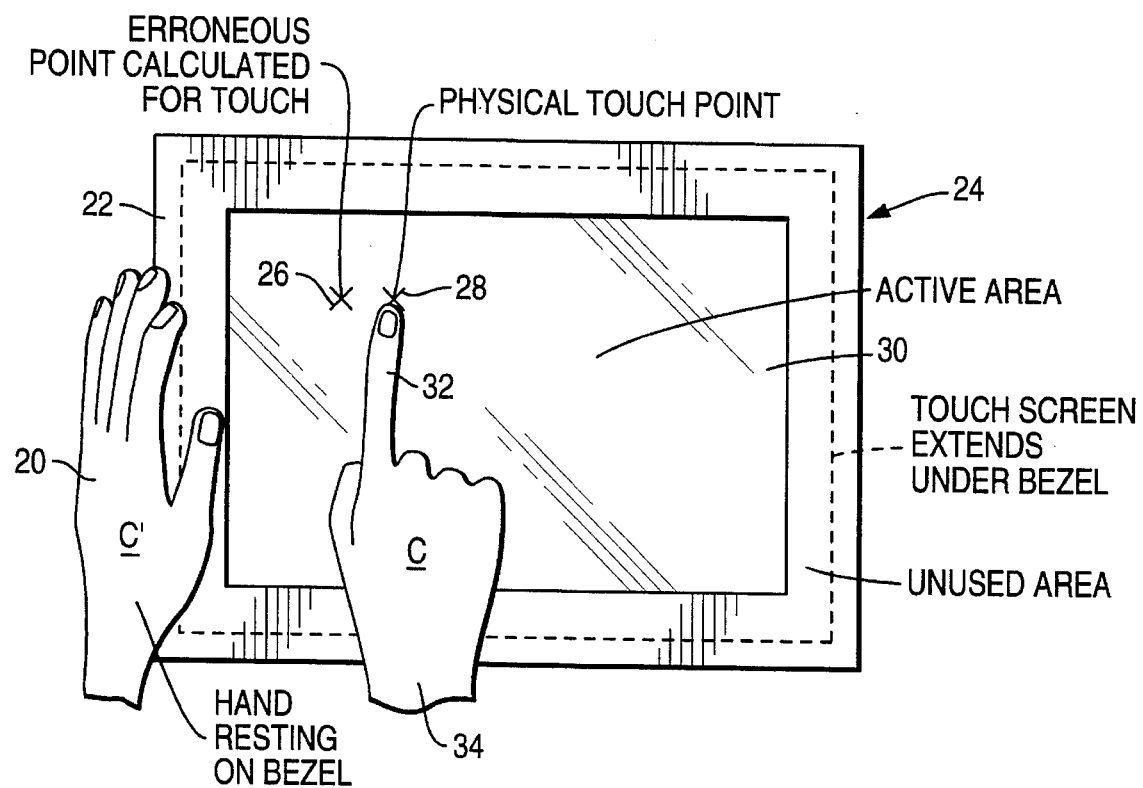
FIG. 2 is a diagrammatic view showing the manner in which errors are introduced in conventional capacitive touch screens when the hand of a user is inadvertently placed on the bezel of a touch screen device.
Figure 3:
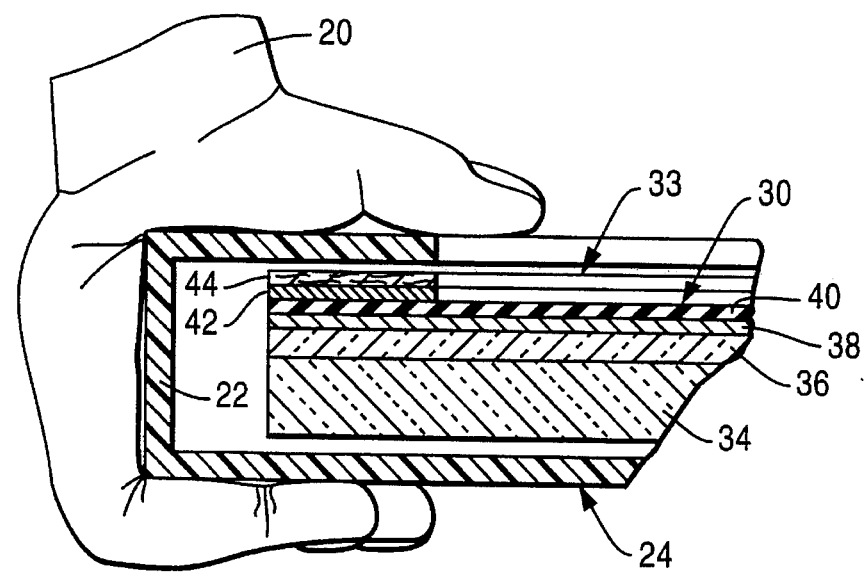
FIG. 3 is a partial sectional view of a prior art capacitive touch screen device, showing a tape shield employed therein.

Referring now to FIG. 4, shown there is a touch screen device 50, which may comprise a business terminal, comprising a housing 52 and a touch screen 54, which is normally transparent to permit viewing of a display 62 positioned beneath it, with an insulating element 64 positioned between the touch screen 54 and the display 62. The touch screen 54 may comprise a glass base 66 having a conductive coating 68 and an insulating coating 70 disposed thereon. The housing 52 includes an aperture 56 through which the touch screen 54 is accessible. A touch screen shield 58 is positioned between the housing 52 and the touch screen 54 and is secured to the touch screen 54. The shield 58 extends beyond the housing 52 so that it is visible from the exterior of the touch screen device 50. An opening 60 in the shield 58 provides access to the touch screen 54 and enables the display 62 to be viewed through the touch screen 54 by a user of the touch screen device 50. Located beneath the touch screen 54 and not visible in FIG. 4 is a display 62 (FIG. 5), which typically may be a liquid crystal display (LCD).

Figure 5:
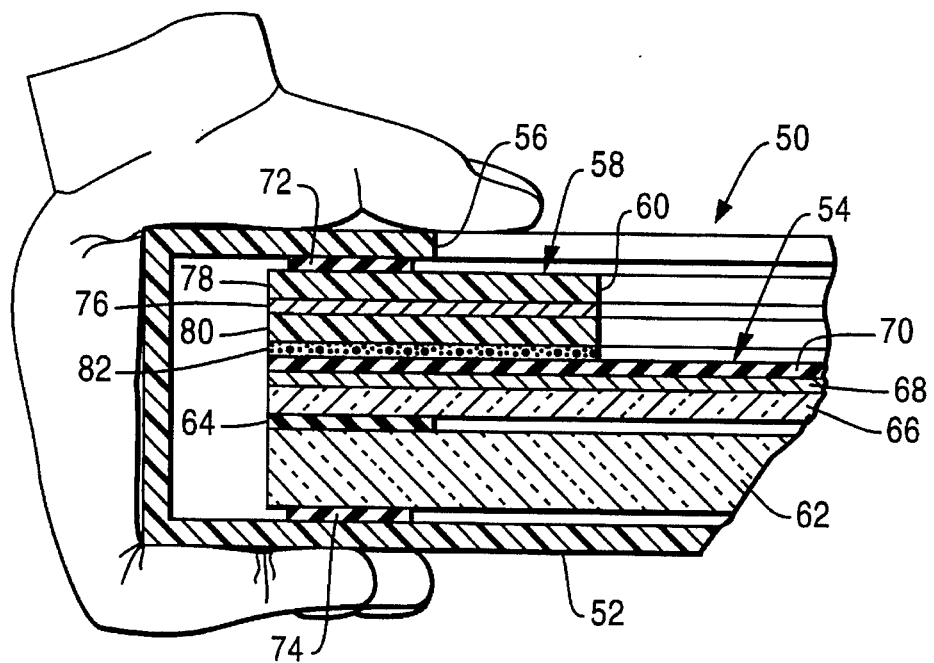
FIG. 5, located on the same sheet as FIG. 3, is a partial sectional view, taken on line 5—5 of FIG. 4, of the capacitive touch screen device of the present invention.

The internal structure of the device 50 is shown in FIG. 5, which is a partial sectional view taken along line 5—5 of FIG. 4. The touch screen 54, with its associated shield and display 62, is held in position in the interior of the device 50 in any suitable manner, as for example by supports 72 and 74.

The touch screen shield 58 comprises a thin layer 76 of conductive material, such as aluminum foil, for example aluminum foil No. 7800, marketed by Minnesota Mining and Manufacturing Company, laminated between two layers 78 and 80 of insulating material, such as a poly-carbonite, for example "LEXAN" (Trademark) marketed by General Electric Company. The shield 58 is secured to the touch screen 54 by a layer of adhesive 82, for example adhesive No. 467 marketed by Minnesota Mining and Manufacturing Company.

The poly-carbonite material has very good cosmetic qualities. It comes in a wide variety of textures and colors. This allows the shield 58 to extend past the opening 56 in the housing 52 and thus be exposed to view by operators of the touch screen device 50, rather than being hidden beneath the housing 52.

It is important to note that since the shield is also electrically insulated, the operator of the touch screen device 50 may physically touch the shield 58 without causing any degradation of its noise shielding characteristics. Non-insulated tape shields will either be rendered useless or will interfere with the operation of the touch screen device if they are touched by the operator.

Figure 6:
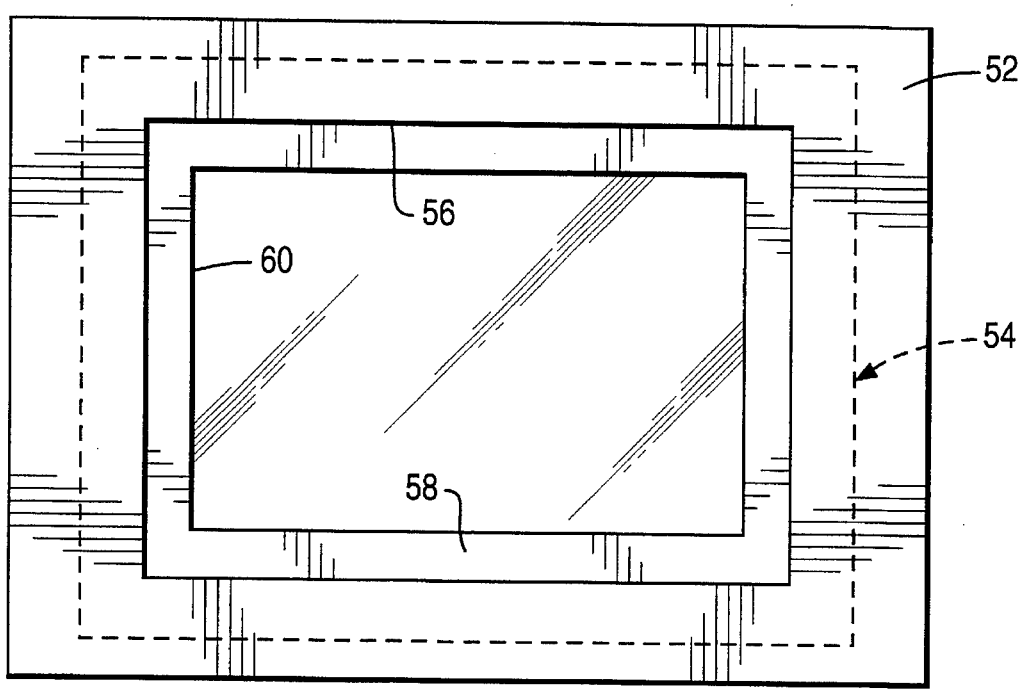
FIG. 6 is a plan view of the touch screen device, showing the use of one size of touch screen shield with one type of display.
Figure 7:
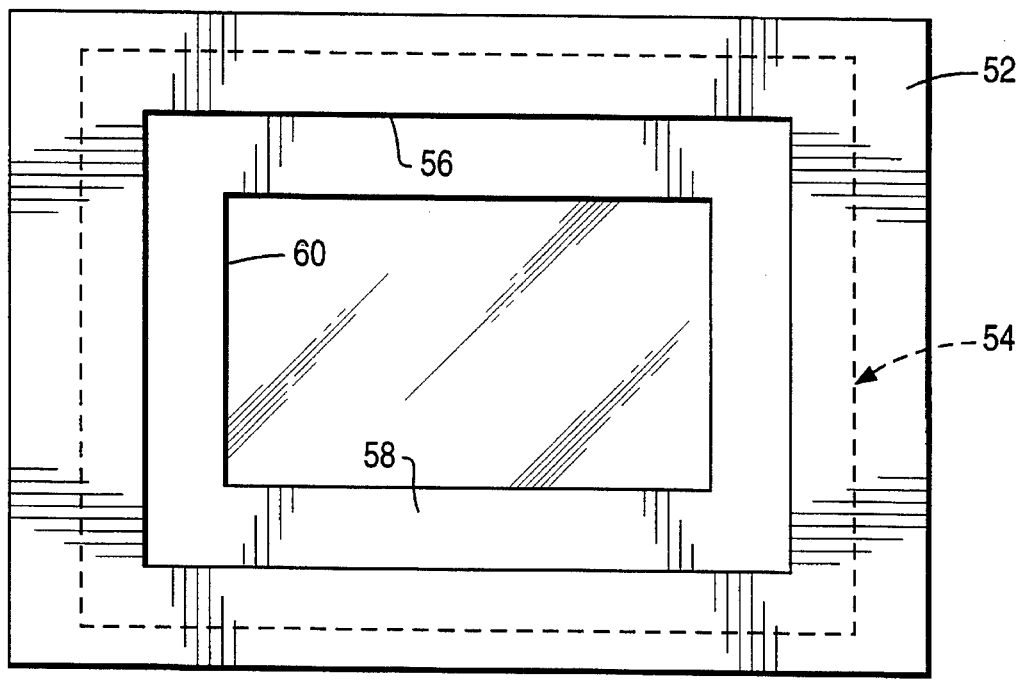
FIG. 7 is a plan view similar to FIG. 6, showing the use of a different size of touch screen shield with a different type of display.

The "viewability" of the shield allows it to be used to cosmetically "adapt" multiple display devices to one size of bezel or housing opening, such as the housing opening 56. This means that one touch screen and one housing can accept several different sizes of displays simply by using touch shields having different sizes of openings, rather than requiring that both the touch screen and the bezel of the housing be retooled to match the size of the display. This is illustrated in FIGS. 6 and 7, in which different sizes of shields 58 having different sizes of openings 60 are used with housings 52 having the same size of central opening 56, in order to accommodate different sizes of displays 62, and to provide different sizes of mattes surrounding the viewable portion of the touch screen 54.

The current rapid pace of development in displays such as LCDs makes it very advantageous to be able to use the same housing for multiple sizes of LCDs. This allows the manufacturer of business machines such as point of sale terminals to create a single cabinet which can remain unmodified throughout the life of the product. As new and improved LCDs become available, the manufacturer can adapt them to the product by using touch screen shields 58 having different sizes of openings 60. Therefore the tooling costs associated with introducing a new LCD on a touch-based system will be much less than normally expected, which allows manufacturers to take full advantage of the rapid pace of LCD technology, rather than being hindered by it.

Although the invention has been described with particular reference to a preferred embodiment thereof, variations and modifications of the present invention can be effected within the spirit and scope of the following claims.

What is claimed is:

1. A capacitive touch screen shield, comprising:
   a layer of conductive material laminated between two layers of insulating material in which the insulating material is poly-carbonite material.

2. A capacitive touch screen shield, comprising:
   a layer of conductive material laminated between two layers of insulating material in which the conductive material is aluminum foil and the insulating material is poly-carbonite material.

3. A capacitive touch screen shield, comprising:
   a layer of conductive material laminated between two layers of insulating material, in which said shield is of generally rectangular shape and has a rectangular shaped central opening, and in which the dimensions of the central opening of the shield are selected in accordance with the dimensions of a display associated with a touch screen being shielded by the shield.

4. A capacitive touch screen shield, comprising:
   a layer of conductive material laminated between two layers of insulating material, in which said shield is of generally rectangular shape and has a rectangular shaped central opening, and in which said shield is positioned inside a housing having a central opening which is larger than the central opening of said shield.

5. The capacitive touch screen shield of claim 3, in which the shield is secured to the touch screen by an adhesive.

6. The capacitive touch screen shield of claim 5, in which the exterior dimensions of the shield are the same as those of the touch screen to which it is secured.

7. A touch screen device, comprising:
   a shield comprising a layer of conductive material laminated between two layers of insulating material of generally rectangular configuration, having an upper surface and a lower surface, and also having a central opening;
   a transparent touch screen secured to the lower surface of the shield and being accessible through said central opening in said shield;
   a housing surrounding the peripheries of the shield and of said transparent touch screen; and a display positioned beneath said transparent touch screen.

8. The touch screen device of claim 7, in which the conductive material of the shield is aluminum foil.

9. The touch screen device of claim 7, in which the insulating material of the shield is a plastic material.

10. The touch screen device of claim 7, in which the insulating material of the shield is poly-carbonite material.

11. The touch screen device of claim 10, in which the conductive material of the shield is aluminum foil and the insulating material is poly-carbonite material.

12. The touch screen device of claim 7, in which the shield is of generally rectangular shape and has a rectangular shaped central opening.

13. The touch screen device of claim 12, in which the dimensions of the central opening of said shield are selected in accordance with the dimensions of the display positioned beneath the touch screen.

14. The touch screen device of claim 12, in which said housing has a central opening which is larger than the central opening of said shield.

15. The touch screen device of claim 7, in which the shield is secured to the touch screen by an adhesive.

16. The touch screen device of claim 7, in which the exterior dimensions of the shield are the same as those of the touch screen.

17. The touch screen device of claim 14, in which a portion of the shield surrounding its central opening is visible through the opening in the housing from the exterior of the touch screen device.

18. A touch screen device, comprising:

a touch screen; and a shield positioned on the touch screen, which shield can be touched by a user of the touch screen device without causing error in the operation of the touch screen device;

also including a housing for containing the touch screen and the shield, said housing having an opening through which the touch screen can be contacted, the shield extending into the opening, said shield having a central opening and forming a matte surrounding the touch screen.

* * * * *